(12) United States Patent
Jackson et al.

(10) Patent No.: US 6,465,546 B1
(45) Date of Patent: Oct. 15, 2002

(54) PROCESS FOR MANUFACTURING A CORE FOR A GOLF BALL

(75) Inventors: Daniel B. Jackson, Vista, CA (US); Amado M. Garcia, Oceanside, CA (US)

(73) Assignee: Callaway Golf Company, Carlsbad, CA (US)

( * ) Notice: Subject to any disclaimer, the term of this patent is extended or adjusted under 35 U.S.C. 154(b) by 82 days.

(21) Appl. No.: 09/690,373

(22) Filed: Oct. 16, 2000

(51) Int. Cl.[7] ............................................... A63B 37/06
(52) U.S. Cl. ...................... 523/351; 524/406; 525/274; 473/371; 473/372
(58) Field of Search ......................... 523/351; 525/274; 473/371, 372; 524/406

(56) References Cited

U.S. PATENT DOCUMENTS

| | | |
|---|---|---|
| 3,791,655 A | 2/1974 | Schweiker et al. |
| 4,169,599 A | 10/1979 | Fujio et al. |
| 4,561,657 A | 12/1985 | Tominaga et al. |
| 4,650,193 A | 3/1987 | Molitor et al. |
| 4,683,257 A | 7/1987 | Kakiuchi et al. |
| 4,715,607 A | 12/1987 | Llort et al. |
| 4,726,590 A | 2/1988 | Molitor |
| 4,770,422 A | 9/1988 | Isaac |
| 4,838,556 A | 6/1989 | Sullivan |
| 4,844,471 A | 7/1989 | Terence et al. |
| 4,852,884 A | 8/1989 | Sullivan |
| 4,858,924 A | 8/1989 | Saito et al. |
| 4,955,613 A | 9/1990 | Gendreau et al. |
| 4,971,329 A | 11/1990 | Llort et al. |
| 5,018,740 A | 5/1991 | Sullivan |
| 5,019,319 A | 5/1991 | Nakamura et al. |
| 5,020,803 A | 6/1991 | Gendreau et al. |
| 5,093,402 A | 3/1992 | Hashimoto et al. |
| 5,096,201 A | 3/1992 | Egashira et al. |
| 5,116,060 A | 5/1992 | Sullivan et al. |
| 5,215,308 A | 6/1993 | Hiraoka et al. |
| 5,387,637 A | 2/1995 | Sullivan |
| 5,403,010 A | 4/1995 | Yabuki et al. |
| 5,490,673 A | 2/1996 | Hiraoka |
| 5,508,350 A * | 4/1996 | Cadorniga |
| 5,721,304 A | 2/1998 | Pasqua, Jr. |
| 5,816,944 A * | 10/1998 | Asakura |
| 5,874,504 A * | 2/1999 | Yokota |
| 6,117,024 A * | 9/2000 | Dewanjee |
| 6,213,894 B1 * | 4/2001 | Sullivan |

FOREIGN PATENT DOCUMENTS

JP      04-319373      * 11/1992

OTHER PUBLICATIONS

Tadmor "Principles of Polymer Processing" p. 438;, 1979.*

* cited by examiner

*Primary Examiner*—David J. Buttner
(74) *Attorney, Agent, or Firm*—Michael A. Catania

(57) ABSTRACT

The present invention discloses a method for producing a uniform synthetic rubber mixture for formation into a golf ball core. The present invention utilizes mixing 50% to 80% of a base rubber material with zinc diacrylate and other materials, and later mixing the entirety of the base rubber material in order to prevent adhesion and loss of zinc diacrylate. The partial mixing allows for the zinc diacrylate to be dispersed throughout the mixture thereby creating a core with more uniform properties.

2 Claims, 2 Drawing Sheets

US 6,465,546 B1

PROCESS FOR MANUFACTURING A CORE FOR A GOLF BALL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a golf ball. More specifically, the present invention relates to a process for manufacturing a core for a golf ball.

2. Description of the Related Art

Currently, most solid golf ball cores contain some form of zinc diacrylate powder in their formulations as a cross-linking co-agent for the main polymer. The polymer may be polybutadiene, natural rubber, polyisoprene, SBR and others. Fillers and peroxide catalysts are also used in manufacturing a golf ball core material.

A major problem with zinc diacrylate is the tendency of the zinc diacrylate to adhere to the mechanism mixing components thereby affecting the uniformity of the formulation. This often requires manual removal of the zinc diacrylate from the mechanical components and reintroduction to the formulation. The problem is greater if the compounds of the formulations are mixed in an internal mixer such as a Banbury mixer or Shaw mixer. The zinc diacrylate adheres to the rotators, the sides of the mixing chamber, the ram, and the discharge doors. If the zinc diacrylate adheres to the internal components, removal is difficult, and may result in addition to subsequent batches of mixture. Thus, some batches will have too much zinc diacrylate and some will have too little zinc diarcylate. The amount of zinc diacrylate is critical to the compression and coefficient of restitution of a golf ball. Thus, the amount of zinc diacrylate will affect the performance of a golf ball when hit with a golf club.

The prior art has made some attempts to overcome the problem. One example is Tominaga et al., U.S. Pat. No. 4,561,657, originally filed in Japan in 1983, which discloses coating a zinc diacrylate powder with a high fatty acid such as lauric acid, stearic acid and palmitic acid to prevent sticking and poor dispersion of the zinc diacrylate in a rubber core mixture.

However, the prior art has failed to disclose a procedure that has universal application.

BRIEF SUMMARY OF THE INVENTION

The present invention provides a solution to the core processing problems of the prior art. The present invention is able to accomplish this by providing a method that allows for the processing of a smaller amount of the total rubber material to prevent loss of the zinc diacrylate.

One aspect of the present invention is a method for manufacturing a core for a golf ball. The method begins with introducing 50 to 80 weight percent of a total amount of a rubber polymer into a mixing chamber. Next, zinc diacrylate is introduced in an amount of 20 to 40 parts per hundred of the total amount of the rubber polymer, and other materials are also added to the mixing chamber. Next, the zinc diacrylate, the 50 to 80 weight percent of the rubber polymer, and the other materials are mixed within the mixing chamber for 1 to 7 minutes at a temperature of at least 100° F. to create a partial volume mixture. Then, the remaining 20 to 50 weight percent of the total amount of the rubber polymer is added to the mixing chamber and a mixed to create a full volume mixture.

Another aspect of the present invention is a golf ball core having uniform dispersion of zinc diacrylate therethrough. The golf ball core is manufactured using the manufacturing process of the present invention. The golf ball core has a PGA compression of 50 to 90 and a coefficient of restitution of at least 0.70. The golf ball core may also have a diameter in the range of 1.45 inches to 1.55 inches.

Yet another aspect of the present invention is a golf ball core having a surface Shore D hardness that is no greater than 8 degrees harder than the center Shore D hardness. The golf ball core is manufactured using the manufacturing process of the present invention. The golf ball core has a PGA compression of 50 to 90 and a coefficient of restitution of at least 0.70. The golf ball core may also have a diameter in the range of 1.45 inches to 1.55 inches.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
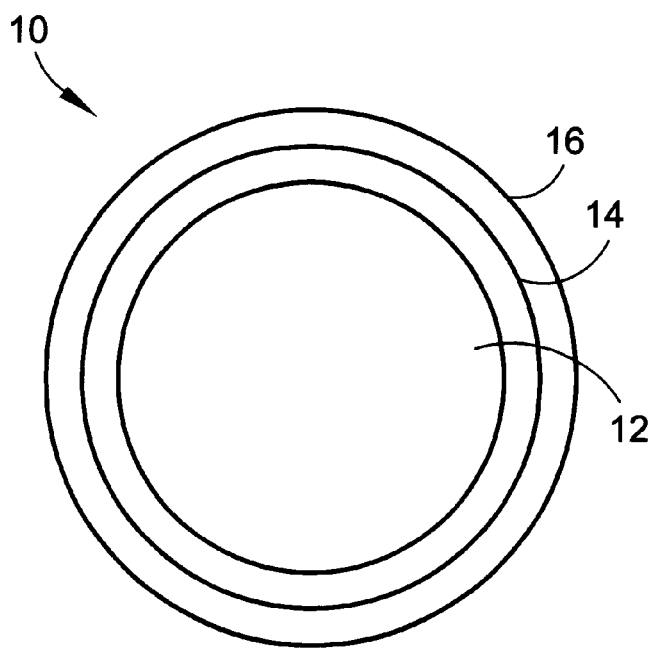
FIG. 1 is a cross-sectional view of a three-piece solid golf ball including a core manufactured according to the present invention.
Figure 2:
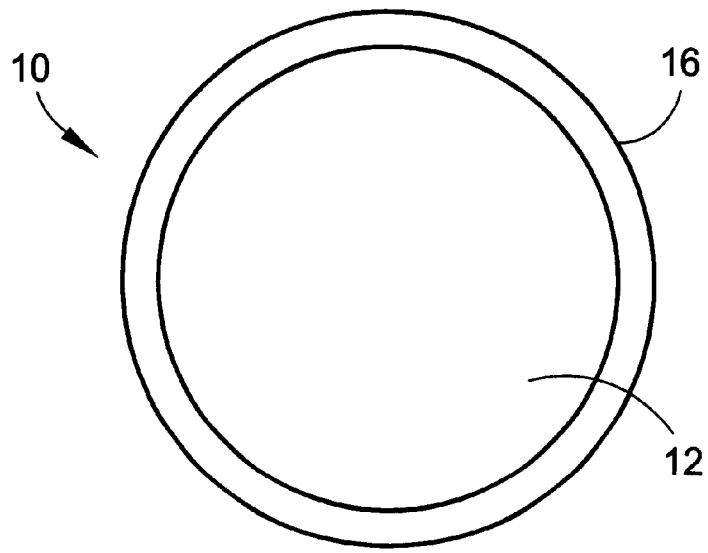
FIG. 2 is a cross-sectional view of a two-piece golf ball including a core manufactured according to the present invention.

Most solid golf balls 10 are either two piece, as shown in FIG. 1, or three piece, as shown in FIG. 2. A solid two-piece golf ball 10 has a solid core 12 and a cover 16, that is usually composed of an ionomer or other thermoplastic material. A solid three-piece golf ball 10 has at least one intermediate layer 14 in addition to the solid core 12 and the cover 16. Those skilled in the relevant art will recognize that other golf ball constructions, such as wound golf balls, four piece golf balls and the like, could utilize a core produced according to the present invention.

The core 12 of the golf ball 10 is the "engine" for the golf ball 10 such that the inherent properties of the core 12 will strongly determine the initial velocity and distance of the golf ball 10. A higher initial velocity will usually result in a greater overall distance for a golf ball. In this regard, the Rules of Golf, approved by the United States Golf Association ("USGA") and The Royal and Ancient Golf Club of Saint Andrews, limits the initial velocity of a golf ball to 250 feet (76.2 m) per second (a two percent maximum tolerance allows for an initial velocity of 255 per second) and the overall distance to 280 yards (256 m) plus a six percent tolerance for a total distance of 296.8 yards (the six percent tolerance may be lowered to four percent). A complete description of the Rules of Golf are available on the USGA web page at www.usga.org. Thus, the initial velocity and overall distance of a golf ball must not exceed these limits in order to conform to the Rules of Golf. Therefore, the core 12 for a USGA approved golf ball is constructed to enable the golf ball 10 to meet, yet not exceed, these limits.

The coefficient of restitution ("COR") is a measure of the resilience of a golf ball. The COR is a measure of the ratio of the relative velocity of the golf ball after direct impact with a hard surface to the relative velocity before impact with the hard surface. The COR may vary from 0 to 1, with 1 equivalent to a completely elastic collision and 0 equivalent to a completely inelastic collision. A golf ball having a COR value closer to 1 will generally correspond to a golf ball having a higher initial velocity and a greater overall distance. If the golf ball has a high COR (more elastic), then the initial velocity of the golf ball will be greater than if the golf ball had a low COR. In general, a higher compression core will result in a higher COR value.

The core 12 of the golf ball 10 is generally composed of a blend of a base rubber, a cross-linking agent, a free radical initiator, and one or more fillers or processing aids. A preferred base rubber is a polybutadiene having a cis-1,4 content above 90%, and more preferably 98% or above.

The use of cross-linking agents in a golf ball core is well known, and metal acrylate salts are examples of such cross-linking agents. For example, metal salt diacrylates, dimethacrylates, or mono(meth)acrylates are preferred for use in the golf ball cores of the present invention, and zinc diacrylate is a particularly preferred cross-linking agent. A commercially available suitable zinc diacrylate is SR-416 available from Sartomer Co., Inc., Exton, Pa. Other metal salt di- or mono-(meth)acrylates suitable for use in the present invention include those in which the metal is calcium or magnesium. In the manufacturing process it may be beneficial to pre-mix some cross-linking agent(s), such as, e.g., zinc diacrylate, with the polybutadiene in a master batch prior to blending with other core components.

Free radical initiators are used to promote cross-linking of the base rubber and the cross-linking agent. Suitable free radical initiators for use in the golf ball core 12 of the present invention include peroxides such as dicumyl peroxide, bis-(t-butyl peroxy) diisopropyl benzene, t-butyl perbenzoate, di-t-butyl peroxide, 2,5-dimethyl-2,5-di-5-butylperoxyhexane, 1,1-di (t-butylperoxy) 3,3,5-trimethyl cyclohexane, and the like, all of which are readily commercially available.

Zinc oxide is also preferably included in the core formulation. Zinc oxide may primarily be used as a weight adjusting filler, and is also believed to participate in the cross-linking of the other components of the core (e.g. as a coagent). Additional processing aids such as dispersants and activators may optionally be included. In particular, zinc stearate may be added as a processing aid (e.g. as an activator). Any of a number of specific gravity adjusting fillers may be included to obtain a preferred total weight of the core 12. Examples of such fillers include tungsten and barium sulfate. All such processing aids and fillers are readily commercially available. The present inventors have found a particularly useful tungsten filler is WP102 Tungsten (having a 3 micron particle size) available from Atlantic Equipment Engineers (a division of Micron Metals, Inc.), Bergenfield, N.J.

Table One below provides the ranges of materials included in the preferred core formulations of the present invention.

TABLE ONE

Core Formulations

| Component | Preferred Range | Most Preferred Range |
|---|---|---|
| Polybutadiene | 100 parts | 100 parts |
| Zinc diacrylate | 20–35 phr | 25–30 phr |
| Zinc oxide | 0–50 phr | 5–15 phr |
| Zinc stearate | 0–15 phr | 1–10 phr |
| Peroxide | 0.2–2.5 phr | 0.5–1.5 phr |
| Filler (e.g. tungsten) | As desired (e.g. 2–10 phr) | As desired (e.g. 2–10 phr) |

In a preferred form, the finished core 12 has a diameter of about 1.35 to about 1.64 inches for a golf ball 10 having an outer diameter of 1.68 inches. The core weight is preferably maintained in the range of about 32 to about 40 g. The core PGA compression is preferably maintained in the range of about 50 to 90, and most preferably about 55 to 80.

As used herein, the term "PGA compression" is defined as follows:

$$PGA\ compression\ value = 180 - Riehle\ compression\ value$$

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85.

As is described above, the golf ball 10 may have at least one layer, the cover 16 or the boundary layer 14, that is composed of a thermoplastic (e.g. thermoplastic or thermoplastic elastomer) or a blend of thermoplastics (e.g. metal containing, non-metal containing or both). A polybutadiene core 12 requires an oxygen barrier layer, which is provided by the cover 16 or the boundary layer 14. Failure to provide an oxygen barrier layer will result in a core that is oxygenated, and thus very hard. Most thermoplastic materials provide some form of oxygen barrier. The thermoplastic may contain organic chain molecules and metal ions. The metal ion may be, for example, sodium, zinc, magnesium, lithium, potassium, cesium, or any polar metal ion that serves as a reversible cross-linking site and results in high levels of resilience and impact resistance. Suitable commercially available thermoplastics are ionomers based on ethylene copolymers and containing carboxylic acid groups with metal ions such as described above. The acid levels in such suitable ionomers may be neutralized to control resiliency, impact resistance and other like properties. In addition, other fillers with ionomer carriers may be used to modify (e.g. preferably increase) the specific gravity of the thermoplastic blend to control the moment of inertia and other like properties. Exemplary commercially available thermoplastic materials suitable for use in a boundary layer 14 or cover of a golf ball 10 include, for example, the following materials and/or blends of the following materials: HYTREL® and/or HYLENE® products from DuPont, Wilmington, Del., PEBAX® products from Elf Atochem, Philadelphia, Pa., SURLYN® products from DuPont, and/or ESCOR® or IOTEK® products from Exxon Chemical, Houston, Tex.

Table Two sets forth data for each of twelve golf balls 10 and each of the cores 12. The weight of each of the golf balls 10 varies from 45.65 grams to 45.92 grams. The PGA compression of each of the golf balls 10 varies from 92 to 101. The average diameter of each of golf balls 10 is consistently 1.684 inches. The core diameter of each of the cores 12 is 1.489 inches or 1.515 inches. The PGA compression of each of the cores 12 varies between 60 and 75 points.

TABLE TWO

| Ball | Ball Weight (grams) | Ball Compression (points) | Average Diameter (inches) | Core Diameter (inches) | Core Compression (points) |
| --- | --- | --- | --- | --- | --- |
| 1 | 45.65 | 92 | 1.684 | 1.489 | 60 |
| 2 | 45.86 | 98 | 1.684 | 1.515 | 70 |
| 3 | 45.92 | 101 | 1.684 | 1.515 | 75 |
| 4 | 45.82 | 94 | 1.684 | 1.489 | 60 |
| 5 | 45.83 | 99 | 1.684 | 1.489 | 65 |
| 6 | 45.90 | 99 | 1.684 | 1.489 | 65 |
| 7 | 45.86 | 96 | 1.684 | 1.515 | 70 |
| 8 | 45.84 | 100 | 1.684 | 1.515 | 75 |
| 9 | 45.84 | 101 | 1.684 | 1.515 | 75 |
| 10 | 45.89 | 98 | 1.684 | 1.515 | 65 |
| 11 | 45.83 | 95 | 1.682 | 1.515 | 65 |
| 12 | 45.84 | 97 | 1.681 | 1.515 | 69 |

Figure 3:
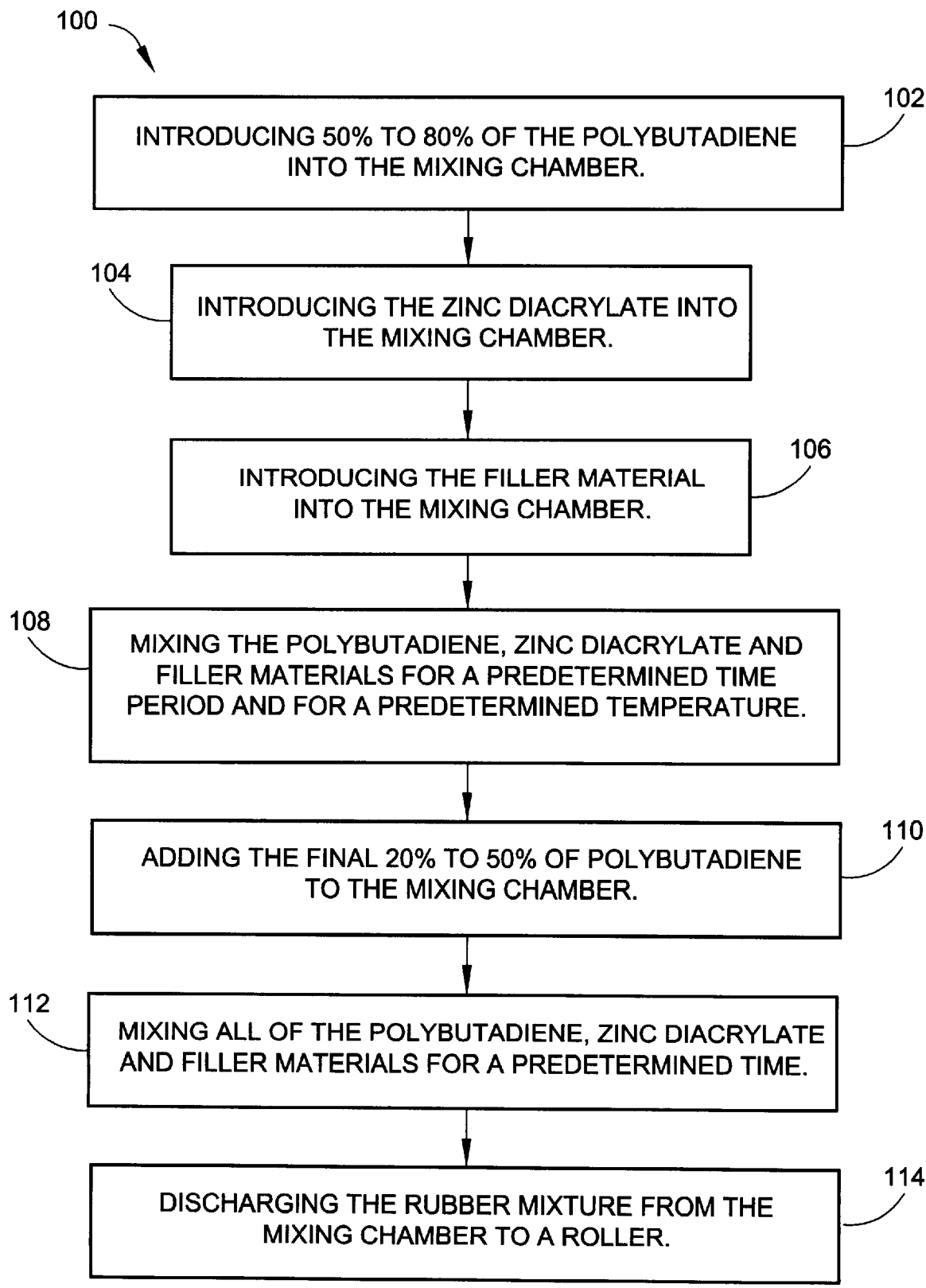
FIG. 3 is a flow chart of the manufacturing process of the present invention.

The cores 12 of the golf balls 10 were manufactured using the process of the present invention. As shown in FIG. 3, the process 100 begins at block 102 with introducing 50% to 80% of the total mixture amount of polybutadiene powder into a mixing chamber. Preferably, 60% to 70% of the total amount is introduced, and most preferably 65% of the total amount of polybutadiene powder is introduced into the mixing chamber. As mentioned previously, a preferred polybutadiene is at least 90% cis 1,4 in content. The mixing chamber is a conventional type that is used for mixing precursor materials into a synthetic rubber.

At block 104, the zinc diacrylate is introduced into the mixing chamber with the 50% to 80% of the polybutadiene. The amount of zinc diacrylate is preferably between 20 to 35 parts per hundred of the total amount of polybutadiene, and most preferably 25 to 30 parts per hundred of the polybutadiene.

At block 106, the other materials are added to the mixture, including zinc oxide (5–15 parts per hundred of the polybutadiene), zinc stearate (1–10 parts per hundred of the polybutadiene), peroxide (0.2–2.5 parts per hundred of the polybutadiene) and tungsten (2–10 parts per hundred of the polybutadiene).

At block 108, the 50% to 80% of the polybutadiene powder, the zinc diacrylate and the other materials are mixed for a predetermined time period at a predetermined temperature. The preferred time period is 2 to 5 minutes, and the temperature of the reaction is allowed to rise to 175° F. The mixing of polybutadiene powder, zinc diacrylate and the other materials is an exothermic reaction. The reaction temperature is controlled by allowing the mixture to rise a predetermined reaction temperature and then cooling the mixing chamber. The mixture is blended by the internal blades at 35 to 40 rotations per minute. This allows the zinc diacrylate and other powdered filler materials to be absorbed by the polybutadiene to prevent adhesion of the zinc diacrylate and other materials to the entrances and exits to the mixing chamber.

At block 110, the entirety of the polybutadiene is added to the mixture within the mixing chamber. This amounts to 20% to 50% of the polybutadiene be added to the mixing chamber, preferably 30% to 40% of the polybutadiene, and most preferably 35%.

At block 112, all of the polybutadiene is mixed with the zinc diacrylate and other materials within the mixing chamber. The mixture is blended by the internal blades at 35 to 40 rpm for 2 to 4 minutes, and the reaction temperature is allowed to rise to between 175° F. to 200° F. The final discharge temperature is 250° F. which is created by setting the cooling water temperature to 130° F. The higher temperatures allow the activating ingredients to melt and become more intimately involved thereby resulting in greater uniformity. The polybutadiene, zinc diacrylate and other materials create a synthetic rubber mixture that has a uniform distribution of components throughout since loss of zinc diacrylate and other materials is prevented by the partial introduction of polybutadiene which results in less adhesion of zinc diacrylate to the components of the mixing chamber.

At block 114, the synthetic rubber mixture is discharged from the mixing chamber without adhesion of the zinc diacrylate and another materials to the discharge doors and internal blades. The synthetic rubber mixture is discharged to a dual roller for further processing.

The synthetic rubber mixture will be aged for a predetermined period of time, and then formed into slugs. Such slugs are then compression molded into spheres to form the core of a golf ball. The cores are then covered with either a single cover, or multiple cover structure.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method for manufacturing a core for a golf ball, the method comprising:

introducing 50 to 80 weight percent of a total amount of a 1,4 cis-polybutadiene into a mixing chamber;

introducing zinc diacrylate into the mixing chamber in an amount of 20 to 40 parts per hundred parts of the total amount of the 1,4 cis-polybutadiene;

introducing zinc oxide into the mixing chamber in an amount of 20 to 50 parts per hundred parts of the total amount of the 1,4 cis-polybutadiene;

introducing tungsten into the mixing chamber in an amount of 2 to 10 parts per hundred parts of the total amount of the 1,4 cis-polybutadiene;

introducing zinc stearate into the mixing chamber in an amount of 1 to 10 parts per hundred parts of the total amount of the 1,4 cis-polybutadiene;

introducing peroxide into the mixing chamber in an amount of 0.2 to 2.5 parts per hundred parts of the total amount of the 1,4 cis-polybutadiene;

blending the zinc diacrylate, the 50 to 80 weight percent of the 1,4 cis-polybutadiene, the tungsten, the zinc stearate, and the peroxide within the mixing chamber for 1 to 7 minutes at a temperature of at least 100° F. to create a partial volume mixture, the blending performed by blades rotating at 35–40 rotations per minute;

adding the remaining 20 to 50 weight percent of the total amount of the 1,4 cis-polybutadiene to the mixing chamber subsequent to the blending;

mixing the remaining 20 to 50 weight percent of the total amount of the 1,4 cis-polybutadiene with the partial volume mixture within the chamber for 2 to 4 minutes at a temperature of 175° F. to 200° F. to create a total volume mixture; and discharging the total volume mixture from the mixing chamber without adhesion of the zinc acrylate to the discharge doors.

2. The method according to claim 1 further comprising forming a core for a golf ball from the total volume mixture, the core having a PGA compression ranging from 50 to 70 and a coefficient of restitution of least 0.70.

* * * * *